United States Patent [19]
Erickson

[11] Patent Number: 6,040,966
[45] Date of Patent: Mar. 21, 2000

[54] DATA STORAGE TAPE CARTRIDGE WITH HUB ALIGNMENT INSERT

[75] Inventor: Leif O. Erickson, Riverfalls, Wis.

[73] Assignee: Imation Corp., Oakdale, Minn.

[21] Appl. No.: 09/096,019

[22] Filed: Jun. 11, 1998

[51] Int. Cl.$^7$ .................. G11B 23/087; G11B 23/037
[52] U.S. Cl. ........................................ 360/132; 242/345
[58] Field of Search ............................. 360/132; 242/345

[56] References Cited

U.S. PATENT DOCUMENTS

| | | | |
|---|---|---|---|
| 3,857,531 | 12/1974 | Jantzen | 242/342 |
| 4,561,609 | 12/1985 | Collins et al. | 242/345.2 |
| 4,581,667 | 4/1986 | Gerfast | 360/99.12 |
| 5,027,249 | 6/1991 | Johnson et al. | 360/132 |
| 5,209,425 | 5/1993 | Krabbenhoft et al. | 242/348.2 |
| 5,513,815 | 5/1996 | Erickson et al. | 242/346 |

FOREIGN PATENT DOCUMENTS

| | | |
|---|---|---|
| 0 588 219 A2 | 3/1994 | European Pat. Off. . |
| 0 747 900 A1 | 12/1996 | European Pat. Off. . |

*Primary Examiner*—Craig A. Renner
*Attorney, Agent, or Firm*—Eric D. Levinson

[57] ABSTRACT

A data storage tape cartridge having an insert for improved hub alignment. The data storage tape cartridge includes a housing defined by a first housing section and a second housing section, a hub pin extending from an interior surface of the first housing section, a tape reel assembly rotatably maintained by the hub pin and a storage tape wrapped about the tape reel assembly. The tape reel assembly includes a hub and an insert. The insert spaces the hub a predetermined distance from the interior surface of the first housing section, thus maintaining the hub in proper alignment. The insert is selected to compensate for inconsistencies in hub pin height, as well as other component variations.

7 Claims, 3 Drawing Sheets

DATA STORAGE TAPE CARTRIDGE WITH HUB ALIGNMENT INSERT

BACKGROUND OF THE INVENTION

The present invention relates to a data storage tape cartridge. More particularly, it relates to a hub portion of a data storage tape cartridge.

Data storage tape cartridges have been used for decades in the computer, audio and video fields. While other forms of media storage, such as disk cartridges, are also available, the data storage tape cartridge continues to be an extremely popular form of recording large volumes of information for subsequent retrieval and use. In conjunction with advancements in tape drive and read/write head technology, various improvements in the tape cartridge design have greatly enhanced performance capabilities, while at the same time reducing costs. For example, evolution of magnetic tape media has resulted in storage tapes with increased storage capacity and product longevity. Additionally, the availability of inexpensive plastic materials and production techniques for various tape cartridge components has reduced overall cost. Obviously, to be competitive, data storage tape cartridge manufacturers must not only improve performance of the tape cartridge, but minimize costs whenever possible.

The data storage tape cartridge generally consists of an outer shell or housing maintaining at least one tape reel and a length of magnetic storage tape. The storage tape is wrapped about a hub portion of the tape reel and is driven through a defined tape path by a driving system. The housing normally includes a separate cover and a base, the combination of which creates an opening (or window) of some type for allowing access to the storage tape by a read/write head upon insertion of the data storage tape cartridge into a tape drive. This interaction between storage tape and head may take place within the housing, or the storage tape may be directed away from the housing to an adjacent area at which the read/write head is located. Where the tape cartridge/drive system is designed to provide head-storage tape interface within or very near the housing, tape positioning is extremely important. In this regard, positioning of the storage tape relative to the head is dictated exclusively by a tape path generated within the tape cartridge housing.

Data storage tape cartridges configured for storage tape engagement within the cartridge housing typically employ two tape reels for maintaining the storage tape. The tape path is defined by the location of the tape reels maintaining the storage tape, as well as various tape guides positioned within the housing. Each tape reel is normally rotatably associated with an interior side of the cover, and includes a hub and opposing radial flanges. The storage tape is wrapped around the hub, between the opposing flanges. Generally speaking, with a two-hub (or tape reel) design, the storage tape extends between the two hubs, along the tape guides. The tape guides are strategically positioned within the housing such that at the cartridge window, the storage tape is parallel to a plane of the window.

In addition to facilitating proper positioning of the storage tape at a desired level in the area of the cartridge window, alignment of the tape reels, and in particular the respective hubs, plays a crucial role in minimizing tape wear. Tape reel "alignment" is normally understood to refer to spacing between the hub and the cover (or other section of the housing). If the hub or hubs are not properly spaced relative to the cover, the storage tape will not be optimally positioned along the tape guide(s). More particularly, each tape guide typically includes at least an outer flange against which an edge of the storage tape may abut. The outer flange is necessary to ensure that the storage tape does not "ride off of" or otherwise disengage the tape guide during operation. Where the hubs, and therefore the tape reels, are properly aligned, the storage tape will articulate along the tape guide(s) such that the tape edge does not contact the outer flange. Where at least one of the hubs is not aligned, however, the storage tape will extend from the misaligned tape reel to the tape guide such that the tape edge does in fact contact the outer flange. Over time, this undesirable interaction may lead to wrinkling or other forms of tape deterioration. In other words, a cross-web tension is generated across the storage tape, possibly causing edge wear. Even further, tape reading errors may result at the high tension side of the storage tape. Because current data writing/reading systems make use of nearly the entire width of the storage tape and utilize increasingly smaller data tracks along the storage tape width, it is imperative that every effort be made to ensure proper hub alignment.

One manufacturing method for associating the tape reel within the housing is to first press fit a straight hub pin into one section of the housing, such as the cover. The hub pin is positioned to extend in a generally perpendicular fashion from an interior surface of the cover. The tape reel is then axially received over the hub pin, such as by an axial bore within the hub. The axial bore is slightly larger in diameter than the hub pin, so that the hub can freely rotate about the hub pin. Alternatively, the hub pin is press fitted into a separate base plate element. The base plate element is then secured within the housing (for example to the cover). Once again, the tape reel is disposed over the hub pin via an axial bore within the hub. While this approach is quite viable for mass production, alignment concerns can arise.

For example, while a mechanical press can reproducibly position the hub pin at a desired location and in a desired plane (i.e., perpendicular to the cover or base plate), it is sometimes difficult for this same device to accurately insert the pin to a desired height. In fact, even complex, expensive machinery is not able to produce consistently acceptable hub pin insertion heights. Once again the tape reel is positioned over the hub pin through the axial bore in the hub. The axial bore does not run the entire length of the hub. Instead, the axial bore terminates at an internal, axial thrust surface. Because the hub is normally made by a plastic injection molding process, the length of the axial bore, and thus the position of the axial thrust surface relative to the opposing flanges, is normally constant. When the hub is positioned over the hub pin, the axial thrust surface contacts a leading end of the hub pin. As a result, spacing of the hub relative to the cover or base plate depends solely upon the height of the hub pin. If the hub pin height is greater or less than expected, the hub will not be properly aligned, resulting in the previously described edge wear or errors. Notably, incorrect hub pin height may also occur due to surface variations in the cover or base plate.

In light of the above concern, efforts have been made to inspect the cover or base plate prior to press fitting the hub pin. By inspecting the surface, it was hoped that certain variations or irregularities in the cover or base plate could be compensated for by adjusting the hub pin insertion mechanism. Unfortunately, however, even with rigorous inspection and compensation methods, unacceptable pin height variances may still occur. The press fitting operation is irreversible. Thus, because most tape cartridges are required to maintain a certain tape path with minimal deviation, a hub pin inserted to an unacceptable height normally results in scrapping of the entire assembly. Obviously, this is an extra cost that data storage tape cartridge manufacturers do not wish to incur.

An additional, albeit unrelated, problem with current designs arises due to the interaction between the leading end of the hub pin and the axial thrust surface of the hub. As previously described, the hub is made of plastic. Conversely, the hub pin is normally made of stainless steel. During use, the axial wall is in constant, rotational contact with the leading end of the hub pin. Over time, wearing of the plastic hub at the axial thrust surface may become a prevalent problem, again resulting in hub misalignment.

Data storage tape cartridges are important tools used to maintain vasts amounts of information. However, with increasingly complex writing/reading and magnetic tape technology, design of the data storage tape cartridge must evolve to provide accurate tape positioning within tight tolerances. Further, current marketplace conditions require that the data storage tape cartridge be as inexpensive to manufacture as possible, with little or no scrap. Therefore, a need exists for a cost effective approach to ensuring alignment of a hub within a data storage tape cartridge.

SUMMARY OF THE INVENTION

One preferred embodiment of the present invention provides a data storage tape cartridge that includes a housing, a hub pin, a tape reel assembly and a storage tape. The housing is defined by a first housing section and a second housing section. The first and second housing sections mate with one another, forming an enclosure within which various other components of the data storage tape cartridge are maintained. The hub pin is attached to an interior surface of the first housing section. The hub pin extends in a generally perpendicular fashion from the interior surface and terminates in a leading end. The tape reel assembly includes a hub, opposing flanges and an insert. The hub is sized to maintain the storage tape. The opposing flanges extend from opposite ends of the hub which further defines an axial bore. The axial bore terminates within the hub at an axial thrust surface such that the axial bore does not pass through the entire hub. The insert is selectively disposed within the axial bore, abutting the axial thrust surface. The tape reel assembly is rotatably secured about the hub pin. More particularly, the tape reel assembly is positioned such that the hub pin is co-axially received within the axial bore of the hub, with the leading end of the hub pin contacting the insert.

In one preferred embodiment, the first housing section includes a cover and a base plate. The hub pin is attached to and extends perpendicularly from an interior surface of the base plate. The base plate, in turn, is secured to the cover.

During use, the data storage tape cartridge of the present invention provides consistent alignment of the hub, and therefore of the tape reel assembly, relative to the interior surface of the first housing section. The insert is preferably sized to compensate for variations in hub pin height, where the hub pin height is defined as a distance between the leading end of the hub pin and the interior surface of the first housing section. By employing a properly sized insert, the hub is aligned, and therefore spaced, within the housing at a desired level to achieve proper storage tape location.

Another aspect of the present invention relates to a method of assembling a tape reel within a data storage tape cartridge. The data storage tape cartridge includes a housing defined by a first housing section mateable to a second housing section. The first housing section includes an interior surface. A hub pin is secured to the first housing section such that the hub pin extends from the interior surface in a generally perpendicular fashion, terminating in a leading end. The method of assembling includes determining a distance between the leading end of the hub pin and the interior surface of the first housing section. A tape reel, including a hub sized to maintain a storage tape, is provided. The hub defines an axial bore extending partially through the hub. An insert is placed within the axial bore of the hub. Finally, the tape reel is co-axially disposed over the hub pin such that the leading end of the hub pin abuts the insert. In one preferred embodiment, the insert is selected from a plurality of differently sized inserts based upon the determined distance between the leading end of the hub pin and the interior surface of the first housing section.

Another aspect of the present invention relates to an insert for a data storage tape cartridge. The data storage tape cartridge includes a housing defined by first and second housing sections, a hub pin attached to an interior surface of the first housing section, a tape reel, including a hub defining an axial bore, rotatably securable to the hub pin and a storage tape maintained by the hub. The insert comprises a spherical body sized for selective placement within the axial bore. In one preferred embodiment, the spherical body is sized to space the hub a predetermined distance from the interior surface of the first housing section.

DETAILED DESCRIPTION OF THE PREFERRED EMBODIMENTS

Figure 1:
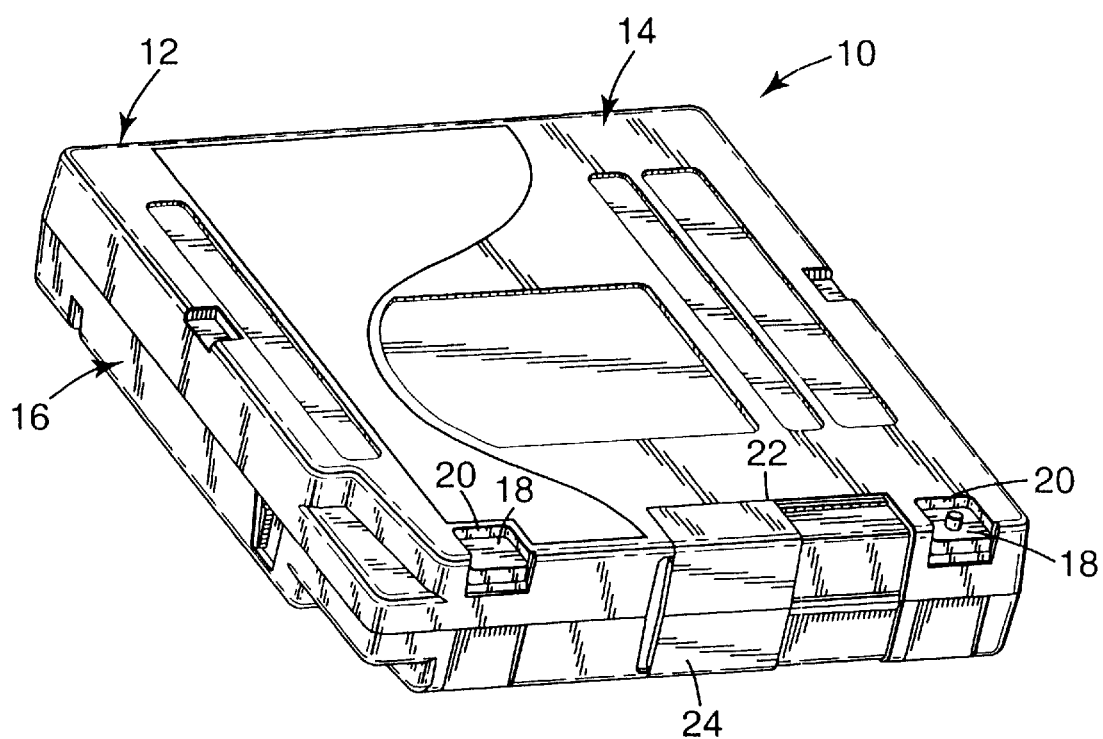
FIG. 1 is a perspective view of a data storage tape cartridge.

One preferred embodiment of a data storage tape cartridge 10 is shown in FIG. 1. Generally speaking, the data storage tape cartridge 10 includes a housing 12 defined by a first housing section 14 and a second housing section 16. The data storage tape cartridge 10 further includes a base plate 18, a portion of which is exposed through recesses 20 in the first housing section 14. Remaining components of the data storage tape cartridge 10 are described in greater detail below. However, with reference to FIG. 1, it should be understood that the first housing section 14 and the second housing section 16 are reciprocally mated to one another and form an enclosure within which the various other components, including the base plate 1S, are maintained.

The housing 12 is preferably sized to be received by a typical tape drive (not shown). Thus, the housing 12 may be sized for use within a 5.25 inch (130 mm) form factor drive, a 3.5 inch (90 mm) form factor drive, or other useful sizes. Further, the first housing section 14 and the second housing section 16 combine to form a window 22 through which storage tape otherwise maintained within the housing 12 can be accessed by a read/write head (now shown). To this end, the data storage tape cartridge 10 includes a door 24. The door 24 is slidably secured to the housing 12 such that the door 24 can be selectively moved to provide access to the window 22.

In a preferred embodiment, the first housing section 14 is a cover, whereas the second housing section 16 is a base. With reference to the orientation shown in FIG. 1, the data storage tape cartridge 10 is normally inserted into a drive (not shown) with the cover 14 facing upward. It should be recognized, however, that the data storage tape cartridge 10 can be orientated to any position. Further, the design of the data storage tape cartridge 10 can be such that the first housing section 14 forms a base, whereas the second housing section 16 is a cover.

Figure 2:
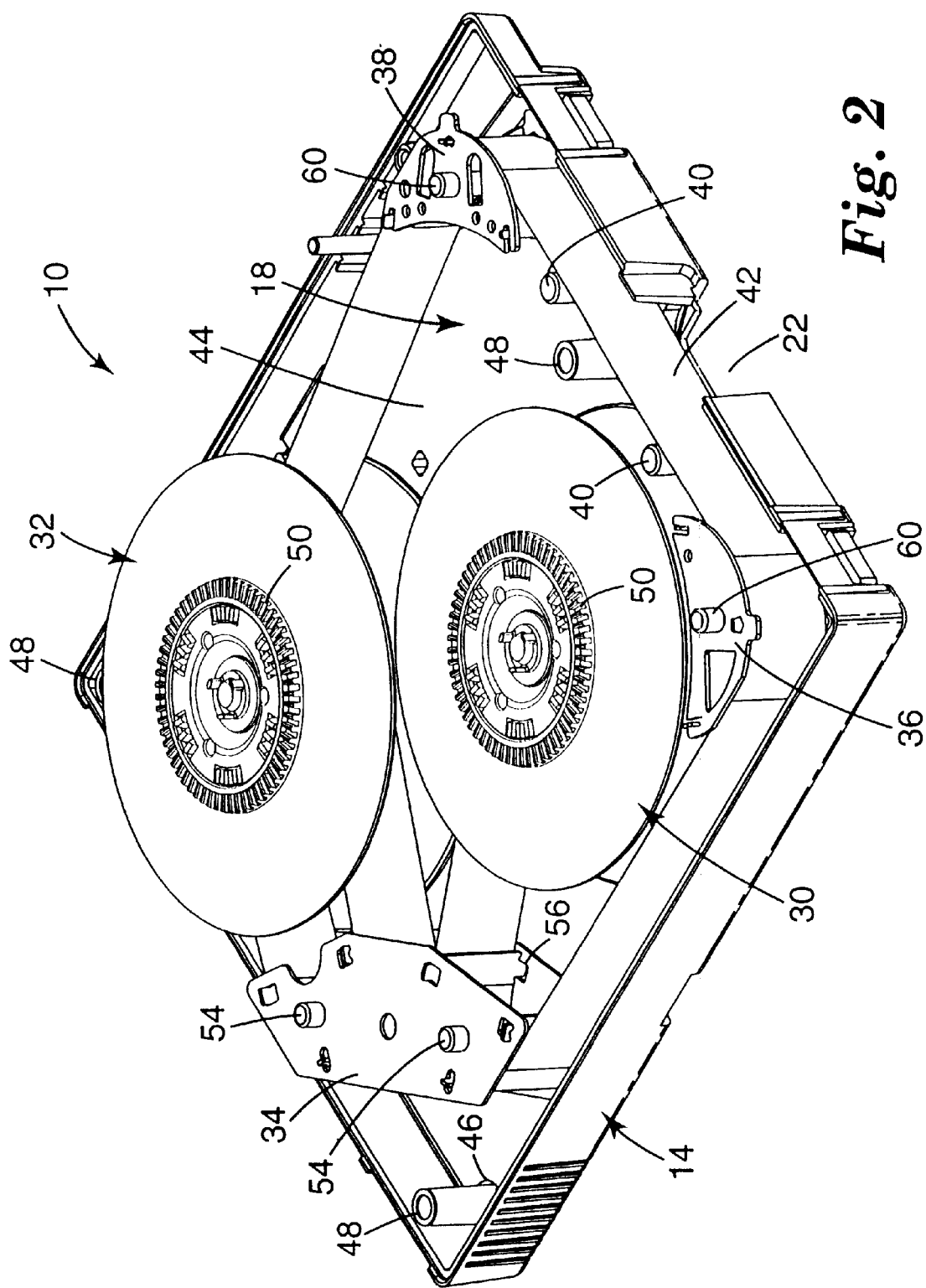
FIG. 2 is a perspective view of the data storage tape cartridge with a portion of a housing removed.

Remaining components of the data storage tape cartridge 10 are shown in FIG. 2. Notably, for ease of illustration, FIG. 2 depicts the first housing section 14 in an inverted position, and the second housing section 16 (FIG. 1) removed. With this orientation in mind, the data storage tape cartridge 10 includes the base plate 18, a first tape reel assembly 30, a second tape reel assembly 32, a first corner guide (or idler bearing) 34, a second corner guide 36, a third corner guide 38, pin guides 40 (or head wrap pins) and a storage tape 42. As described in greater detail below, the first tape reel assembly 30 and the second tape reel assembly 32 are rotatably secured about respective hub pins (not shown) extending from an interior surface 44 of the base plate 18. The remaining guides 34–40 are secured to the interior surface 44 of the base plate 18.

In a preferred embodiment, the base plate 18 is made of a rigid material, such as aluminum. The base plate 18 is sized to nest within the first housing section 14 and includes recesses 46 positioned to allow passage of various protrusions 48 in the first housing section 14. The protrusions 48 are configured to frictionally receive extensions (not shown) of the second housing section 16 (FIG. 1).

The first tape reel assembly 30 and the second tape reel assembly 32 are described in greater detail below. In general terms, however, the tape reel assemblies 30, 32 are virtually identical and are positioned to rotate relative to the base plate 18 about the respective hub pins (not shown). It should be noted that the first and second tape reel assemblies 30, 32 each include a toothed exterior surface 50. During use, a portion of the tape drive (not shown) engages the toothed exterior surfaces 50 for controlled rotation of the first and second tape reel assemblies 30, 32.

The first corner guide 34 is secured to the base plate 18 by pins 54 and includes a first arcuate surface 56 (at the backside of which is shown partially in FIG. 2) and a second arcuate surface (not shown). The second corner guide 36 and the third corner guide 38 are similarly secured to the base plate 18 by pins 60 and likewise each provide an arcuate surface. The pin guides 40 are positioned on the base plate 18 adjacent the window 22 in the first housing section 14.

Finally, the storage tape 42 is preferably a magnetic tape of a type commonly known in the art. For example, the storage tape 42 may consist of a balanced polyethylene naphthalate (PEN) based material coated on one side with a layer of magnetic material dispersed within a suitable binder system, and on the other side with a conductive material dispersed in a suitable binder system. Acceptable magnetic tape is available, for example, from Imation Corp. of St. Paul, Minn.

As shown in FIG. 2, the above components combine to define a tape path for the storage tape 42. In particular, the storage tape 42 extends from the first tape reel assembly 30, and articulates around the first arcuate surface 56 of the first corner guide 34, then extending to the second corner guide 36 and the third corner guide 38. Notably, the second corner guide 36 and third corner guide 38 maintain a vertical planar positioning of the storage tape 42 at the window 22 of the first housing section 14, with the magnetic side of the storage tape 42 facing the window 22. The pin guides 40 are positioned at opposite sides of the window 22 to define a head wrap angle when the storage tape 42 is engaged by head (not shown) during use. From the third corner guide 38, the storage tape 42 articulates about an exterior portion of the second tape reel assembly 32, extends to the second arcuate surface (not shown) of the first corner guide 34 and is finally wrapped around the second tape reel assembly 32.

As should be evident from the above description, the storage tape 42 is required to articulate through several turns when passing from the first tape reel assembly 30 to the second tape reel assembly 32. In this regard, the various guides 34–40 are preferably configured to maintain the storage tape 42 at a predetermined level, especially in the region of the window 22. However, unexpected variations in the position of the first and/or second tape reel assembly 30, 32 relative to the base plate 18 can lead to tape deterioration and possible problems during reading and/or writing operations. For example, edges of the storage tape 42 may be forced against the planar surfaces (or outer flanges) of the corner guides 34–38, resulting in undesirable edge wear or even a catastrophic wrinkle or crease in the storage tape 42. Additionally, a cross-web tension may be created across the storage tape 42, resulting reading errors at the high-tension side of the storage tape 42. Finally, if the first tape reel assembly 30 is not precisely spaced from the base plate 18, the storage tape 42 may extend at an upward or downward angle between the second corner guide 36 and the third corner guide 38. As the read/write head (not shown) interacts with the storage tape 42 at the window 22, this deviation in tape orientation may result in reading errors. The present invention overcomes this problem by providing a unique configuration for the first and second tape reel assemblies 30, 32.

Figure 3:
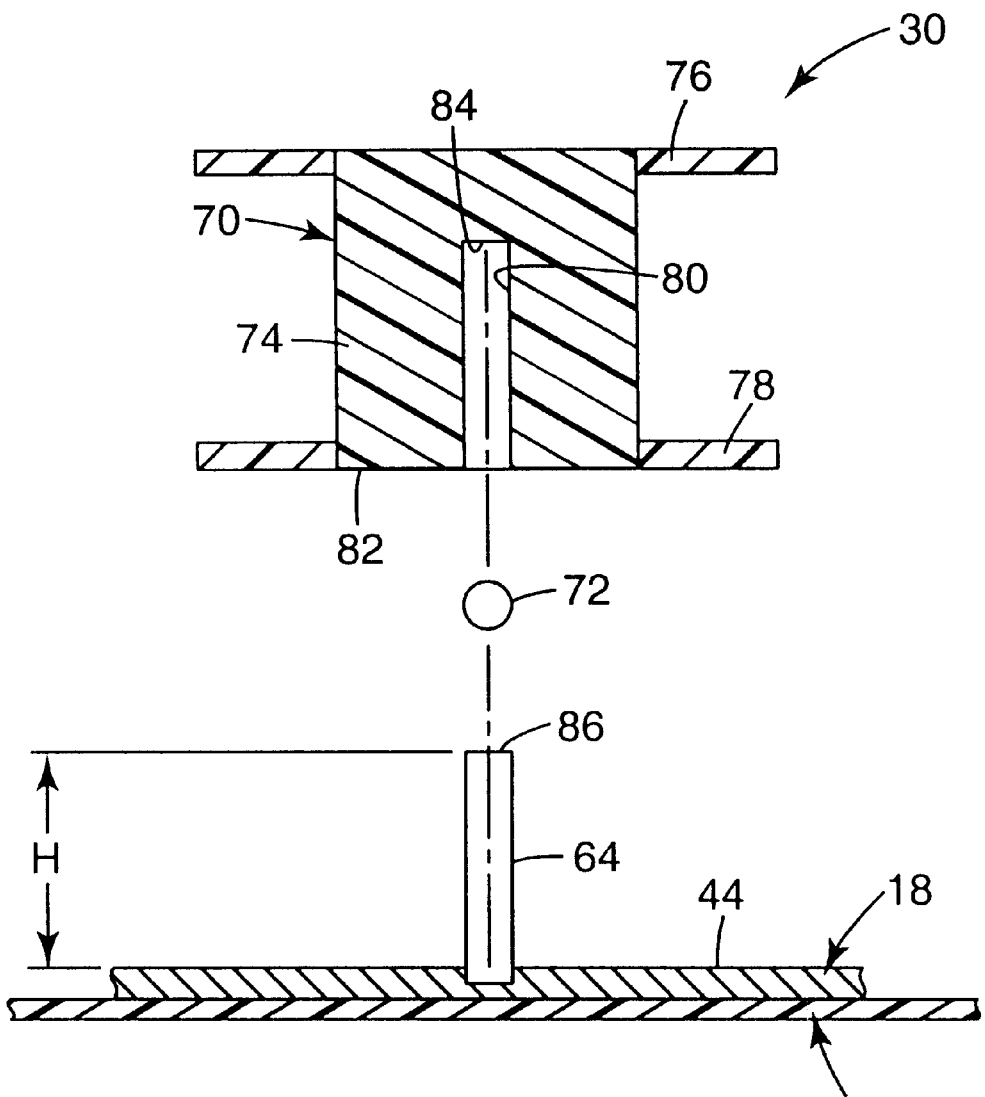
FIG. 3 is an exploded view of a portion of the data storage tape cartridge, depicting assembly of a tape reel to a hub pin in accordance with the present invention.

FIG. 3 shows a portion of the base plate 18 and the first housing section 14, as well as the first tape reel assembly 30, in greater detail. While not shown, the second tape reel assembly 32 is identical in construction and assembly to the base plate 18. As previously described, a hub pin 64 is attached to the base plate 18, extending in a generally perpendicular fashion from the interior surface 44. The first tape reel assembly 30 includes a tape reel 70 and an insert 72. As described in greater detail below, the insert 72 serves to space the tape reel 70 a predetermined distance from the interior surface 44 of the base plate 18.

The tape reel 70 consists of a hub 74 and opposing flanges, including an upper flange 76 and a lower flange 78. The terms "upper" and "lower" as used for the upper flange 76 and the lower flange 78 are with reference to the orientation shown in FIG. 3. It should be understood that the use of these terms is for clarity only, and that the data storage tape cartridge 10, and thus the tape reel 70, may actually be oriented in any direction relative to the world in general. In one preferred embodiment, the hub 74 is manufactured separately from the upper flange 76 and the lower flange 78, which are subsequently attached to the hub 74. Alternatively, the hub 74 and the opposing flanges 76, 78 can be integrally formed. The upper flange 76 and the lower flange 78 are spaced along the hub 74 in accordance with a width of the storage tape 42 (FIG. 2). The storage tape 42 wraps around an outer circumference of the hub 74, tightly maintained between the opposing flanges 76, 78.

The hub 74 and the flanges 76, 78 are preferably made of a relatively rigid plastic material, although other materials, such as stainless steel, aluminum, etc. are also available. In one preferred embodiment, the hub has an outer diameter of approximately 0.9 inch (23 mm), whereas the upper and lower flanges 76, 78 have outer diameters of approximately 2.4 inches (61 mm). It should be recognized that virtually any other sizes, either greater or smaller, are equally as acceptable.

As shown in FIG. 3, the hub 74 defines an axial bore 80. The axial bore 80 extends from an end 82 of the hub 74, terminating at an axial thrust surface 84. The axial bore 80 preferably has a diameter slightly greater than that of the hub pin 64. In one preferred embodiment, the axial bore 80 has a diameter of approximately 0.12 inch (3 mm) although other dimensions, greater or smaller, are also available. Further, manufacture of the hub 74 results in the axial bore 80 having a predetermined length. In one preferred embodiment, the axial bore 80 has a length of approximately 0.55 inch (14 mm), although other lengths, greater or smaller, are equally acceptable. Thus, the axial thrust surface 84 is located at a known position relative to the upper flange 76 and the lower flange 78.

The insert 72 is sized to fit within the axial bore 80 and is preferably a sphere. Alternatively, other shapes, such as a flattened disk, may also be useful. The insert 72 is preferably made of a hardened, wear resistant material such as stainless steel. Other materials, such as aluminum, may also be useful. As described in greater detail below, the preferred spherical shape of the insert 72 can assume a wide variety of diameters to facilitate proper alignment of the hub 74, and thus the tape reel 70, relative to the base plate 18.

As previously described, the hub pin 64 is associated with the base plate 18. In one preferred embodiment, the hub pin 64 is press fitted into the base plate 18, extending from the interior surface 44 in a generally perpendicular fashion. In this regard, the hub pin 64 terminates at a leading end 86, generating a pin height H. The pin height H is defined as the distance between the leading end 86 of the hub pin 64 and the interior surface 44 of the base plate 18. While the press fitting operation permanently secures the hub pin 64 to the base plate 18, it is often times difficult to consistently produce the same pin height H. Thus, the generally accepted manufacturing approach of placing the tape reel 70 over the hub pin 64, without use of the insert 72, may result in inconsistencies in hub alignment. In other words, the normal assembly procedure places the hub 74 over the hub pin 64 such that the leading end 86 contacts the axial thrust surface 84 of the axial bore 80. Spacing, and therefore alignment, of the tape reel 70 is dictated solely by the pin height H. Even further, variations in the base plate 18 length of the axial bore 80 will also impact hub and tape reel alignment. Use of the insert 72 overcomes these alignment problems as made clear by the following method of assembly.

Once the hub pin 64 has been press fitted into the base plate 18, the pin height H is determined. A length of the axial bore 80 is normally known, but can also be measured. With these two dimensional characteristics in mind, a properly sized insert 72 is selected. More particularly, a certain spacing is normally required between the hub 74 and the interior surface 44 of the base plate 18. Depending upon the pin height H and the length of the axial bore 80, an appropriately sized insert 72 is selected for subsequent insertion into the axial bore 80. For example, it may be that a spacing of 0.050 inch (1.27 mm) between the hub 74 and the interior surface 44 of the base plate 18 is required. If the pin height H is found to be 0.510 inch (12.95 mm) and the axial bore 80 has a length of 0.550 inch (13.97 mm), the insert 72 must have a height of 0.090 inch. In the preferred embodiment, the insert 72 is a sphere. Thus, in the above example, the selected sphere 72 will have a diameter of 0.090 inch (2.29 mm).

During mass production, the pin height H will vary from cartridge to cartridge. To facilitate assembly, then, a plurality of differently sized inserts 72 is made available. Where the insert 72 is a stainless steel sphere, a number of these spheres having a wide variety of diameters is provided. Importantly, accurately produced stainless steel spheres can be made available in incremental sizes on a relatively inexpensive basis. For example, stainless steel spheres having diameters incrementing by 0.0005 inch (0.0127 mm) could be provided.

Once the properly sized insert 72 is selected, a lubricant, such as a non-migrating grease, is placed into the axial bore 80, coating the bore wall. The lubricant is preferably somewhat tacky such that the insert 72 will loosely adhere to the axial thrust surface 84.

With the insert 72 disposed in the axial bore 80, the first tape reel assembly 30 is then placed over the hub pin 64. Because the insert 72 adheres to the lubricant otherwise coating the axial bore 80, the insert 72 will not easily release from or otherwise disengage the axial bore 80 when the tape reel 70 is orientated in the position shown in FIG. 3. As the tape reel 70 is maneuvered toward the interior surface 44 of the base plate 18, the leading end 86 of the hub pin 64 contacts the insert 72. Further movement of the tape reel 70 toward base plate 18 positions the insert 72 in an abutting relationship with the axial thrust surface 84 of the axial bore 80. In this final position, the insert 72 abuts the axial thrust surface 84 of the hub 74 and the leading end 86 of the hub pin 64 on opposite sides.

Proper alignment of the tape reel 70 relative to the base plate 18 is then confirmed. If it is determined that the actual spacing between the hub 74 and the interior surface 44 of the base plate 18 is outside of an acceptable tolerance range, the tape reel 70 is simply removed from the hub pin 64 and the insert 72 replaced with a differently sized insert. Thus, unlike previous manufacturing techniques, misalignment of the hub pin 64 to the base plate 18 only requires use of an appropriately sized insert 72, as opposed to costly destruction of the entire base plate assembly.

During operation, the storage tape 42 (FIG. 2) is wrapped about the hub 74 of the tape reel 70. With reference to FIGS. 1 and 3, upon final assembly of the housing 12, the second housing section 16 maintains the tape reel 70 over the hub pin 64. In particular, the second housing section 16 prevents the tape reel 70 from disengaging the hub pin 64. During use, the tape reel 70 rotates about the hub pin 64. In this regard, the insert 72 provides an improved thrust surface. More particularly, the insert 72 rotates with the hub 74, bearing on the leading end 86 of the hub pin 64. In one preferred embodiment, the insert 72 is made of stainless steel, as is the hub pin 64. As a result, little, if any, wear of the insert 72 or the hub 74 occurs. This is in direct contrast to the previous designs in which the hub 74, which is normally constructed of a plastic material, and particularly the axial thrust surface 84, acted directly on the leading end 86 of the hub pin 64.

The second tape reel assembly 32 is virtually identical in construction and operation to the above-described first tape reel assembly 30. The hub pin coinciding with the second tape reel assembly 32 may have a different pin height then the hub pin 64. If so, the insert used with the second tape reel assembly 32 will be of a different size then the insert 72 associated with the first tape reel assembly 32.

Use of the insert 72 can compensate for a wide variety of manufacturing-based alignment errors. For example, it has been found that use of a properly sized stainless steel sphere for the insert 72 will address tolerance deviations in terms of the pin height H, flatness of the base plate 18, distance between the axial thrust surface 84 and the upper flange 76, and distance between the base plate 18 and the upper flange 76. Taken in combination, the insert 72 can compensate for deviations in the range of approximately plus or minus 0.0060 inch (0.152 mm).

The data storage tape cartridge having an insert for hub alignment of the present invention provides a marked improvement over previously used designs. The insert facilitates consistent alignment of the tape reel on a highly cost effective basis. By employing the method of assembling a tape reel within a tape cartridge provided by the present invention, data storage tape cartridge manufacturers are no longer required to use expensive press fitting machinery to insert hub pins. Further, any slight error in hub pin height or other cartridge components is easily overcome by using the insert, and no longer requires scrapping of the product. Finally, where the insert is a stainless steel sphere, an improved thrust surface is provided, having less wear and better maintaining alignment during the life of the cartridge.

Although the present invention has been described with reference to preferred embodiments, workers skilled in the art will recognize that changes may be made in form and detail without departing from the spirit and scope of the invention. For example, the data storage tape cartridge has been described as preferably including a base plate nesting within the first housing section (or cover). The base plate, however, is not a required element. Instead, the hub pin can be secured directly to the interior surface of the first or second housing section. Similarly, while the data storage tape cartridge has been shown as preferably incorporating a dual tape reel design, the hub alignment insert of the present invention applies equally as well to a single tape reel design.

What is claimed:

1. A data storage tape cartridge comprising:

a housing defining a first housing section and a second housing section;

a hub pin attached to an interior surface of the first housing section, the hub pin extending in a generally perpendicular fashion from the interior surface and terminating in a leading end;

a tape reel assembly rotatably associated with the hub pin, the tape reel assembly comprising:

a tape reel including a hub and opposing flanges, the hub defining an axial bore extending from one end of the hub and terminating at an axial thrust surface, and an insert selectively disposed within the axial bore, the insert abutting the axial thrust surface, wherein the hub pin is axially received within the axial bore such that the leading end of the hub pin abuts the insert; and a storage tape maintained by the hub.

2. The data storage tape cartridge of claim 1, wherein the insert is a sphere.

3. The data storage tape cartridge of claim 1, wherein the insert is sized to space the hub a predetermined distance from the interior surface of the first housing section.

4. The data storage tape cartridge of claim 1, wherein the insert is made of stainless steel.

5. The data storage tape cartridge of claim 1, further comprising:

a second hub pin attached to the interior surface of the first housing section, the second hub pin extending in a generally perpendicular fashion from the interior surface and terminating in a leading end; and a second tape reel assembly rotatably associated with the second hub pin, the second tape reel assembly comprising:

a second tape reel including a second hub, sized to receive the storage tape, and opposing flanges, the second hub defining an axial bore extending within the second hub and terminating at an axial thrust surface, and a second insert selectively disposed within the axial bore of the second hub, the second insert abutting the axial thrust surface of the second hub, wherein the second hub pin is axially received within the axial bore of the second hub such that the leading end of the second hub pin abuts the second insert.

6. The data storage tape cartridge of claim 1, wherein the first housing section includes a cover and a base plate, the cover configured to mate with the second housing section and the base plate sized to nest within the cover, and further wherein the hub pin is attached to the base plate.

7. The data storage tape cartridge of claim 6, wherein the hub pin is press fitted into the base plate.

* * * * *